US007045252B2

(12) United States Patent
Christian et al.

(10) Patent No.: US 7,045,252 B2
(45) Date of Patent: May 16, 2006

(54) ALKALINE BATTERY INCLUDING LAMBDA-MANGANESE DIOXIDE

(75) Inventors: Paul A. Christian, Norton, MA (US); Zhiping Jiang, Westford, MA (US); Rita Komm, Needham, MA (US)

(73) Assignee: The Gillette Company, Boston, MA (US)

( * ) Notice: Subject to any disclaimer, the term of this patent is extended or adjusted under 35 U.S.C. 154(b) by 358 days.

(21) Appl. No.: 10/214,329

(22) Filed: Aug. 8, 2002

(65) Prior Publication Data

US 2004/0058242 A1 Mar. 25, 2004

(51) Int. Cl.
*H01M 4/50* (2006.01)
(52) U.S. Cl. ...................... 429/224; 429/229; 429/206; 429/232; 429/271; 29/623.1
(58) Field of Classification Search ................ 429/224, 429/229, 206, 232, 217; 29/623.1
See application file for complete search history.

(56) References Cited

U.S. PATENT DOCUMENTS

| 4,246,253 | A | * | 1/1981 | Hunter ...................... 423/605 |
| 4,312,930 | A | | 1/1982 | Hunter |
| 4,384,029 | A | | 5/1983 | Kordesxh et al. |
| 4,451,543 | A | | 5/1984 | Dzieciuch et al. |
| 4,604,336 | A | * | 8/1986 | Nardi ......................... 429/224 |
| 5,316,877 | A | | 5/1994 | Thackeray et al. |
| 5,425,932 | A | | 6/1995 | Tarascon |
| 6,270,921 | B1 | | 8/2001 | Kaplan et al. |
| 6,783,893 | B1 | * | 8/2004 | Bowden et al. ............. 429/224 |
| 2004/0023110 | A1 | * | 2/2004 | Parent et al. ............... 429/206 |

FOREIGN PATENT DOCUMENTS

| WO | WO 02/059991 A2 | 8/2002 |
| WO | WO 03/044879 A2 | 5/2003 |
| ZA | 8702681 A * | 11/1988 |

OTHER PUBLICATIONS

Schilling et al., "Modification of the High-Rate Discharge Behavior of Zn-MnO2 Alkaline Cells Through the Addition of Metal Oxides to the Cathode", ITE Letters on Batteries, New Technologies and Medicine, vol. 2, No. 3, (2001) pp. 341-348.*
Bowden et al., "Manganese Dioxide for Alkaline Zinc Batteries", ITE letters on Batteries, New Technologies and Medicine, vol. 1, No. 6 (2002) p. 53.*

Ammundsen, B. et al., "Effect of Chemical Extraction of Lithium on the Local Structure of Spinel Lithium Manganese Oxides Determined by X-ray Absorption Spectroscopy," Chem. Mater., vol. 8, No. 12, pp. 2799-2808, (1996).
Endres, P. et al., "Extraction of lithium form spinel phased of the system $Li_{1+x}Mn_{2-x}O_{4-\delta}$," Journal of Power Sources, vol. 69, pp. 145-156, (1997).
Hunter, J. C. et al., "Nonaqueous Electrochemistry of Lambda- $MnO_2$," Proc. Electrochem. Soc., vol. 85-4, pp. 444-451, (1985).
Hunter, J. C., "Preparation of a New Crystal Form of Manganese Dioxide: $\lambda$- $MnO_2$," Journal of Solid State Chemistry, vol. 39, pp. 142-147, (1981).
Kanzaki Y. et al., "Mechanism of Lithium Ion Insertion into $\lambda$-$MnO_2$," J. Electrochem. Soc., vol. 138, No. 1, pp. 333-334, (1991).
Kozawa, Akiya, "Formation of Manganate and Permanganate Ions from Manganese Dioxide in Aqueous Solution," J. Electrochem. Soc., vol. 44, No. 8, pp. 508-513, (1976).
Larcher, D. et al., "Synthesis of $MnO_2O_4$ in Aqueous Acidic Media," J. Electrochem. Soc., vol. 145, No. 10, pp. 3392-3400, (1998).
Ohzuku, T. et al., "Electrochemistry of Manganese Dioxide in Lithium Nonaqueous Cell," J. Electrochem. Soc., vol. 137, No. 3, pp. 769-775, (1990).
Patrice, R. et al., "Understanding the second electron discharge plateau in $MnO_2$-based alkaline cells," ITE Letters on Batteries, New Technologies & Medicine, vol. 2, No. 4, pp. 495-503, (2001).
Read, J. et al,. "Low Temperature Performance of $\lambda$-$MnO_2$ in Lithium Primary Batteries," Electrochemical and Solid-State Letters, vol. 4, Issue 10 (2001).
Schilling, O. et al., "Modification of the High-Rate Discharge Behavior of Zn-$MnO_2$ Alkaline Cells through the Addition of Metal Oxides to the Cathode," vol. 2, No. 3, pp. 341-348, (2001).
Xia, X. et al., "The electrochemical performance of .lambda.-$MnO_2$ in alkaline solution," Dianyuan Jishu, vol. 23 (Suppl.), pp. 74-76, (1999)—abstract only.

* cited by examiner

*Primary Examiner*—Laura Weiner
(74) *Attorney, Agent, or Firm*—Fish & Richardson P.C.

(57) ABSTRACT

An alkaline battery includes a cathode including lambda-manganese dioxide and gamma-manganese dioxide, an anode including zinc, a separator between the cathode and the anode, and an alkaline electrolyte contacting the anode and the cathode.

32 Claims, 4 Drawing Sheets

ALKALINE BATTERY INCLUDING LAMBDA-MANGANESE DIOXIDE

TECHNICAL FIELD

This invention relates to an alkaline battery including lambda-manganese dioxide and a method of manufacturing an alkaline battery including lambda-manganese dioxide.

BACKGROUND

Batteries, such as alkaline batteries, are commonly used as energy sources. Generally, alkaline batteries have a cathode, an anode, a separator and an alkaline electrolyte solution. The cathode can include a cathode material (e.g., manganese dioxide or nickel oxyhydroxide), carbon particles that enhance the conductivity of the cathode, and a binder. The anode can be formed of a gel including zinc particles. The separator is disposed between the cathode and the anode. The alkaline electrolyte solution, which is dispersed throughout the battery, can be an aqueous hydroxide solution such as potassium hydroxide.

SUMMARY

An alkaline battery includes a cathode including lambda-manganese dioxide (e.g., $\lambda$-$MnO_2$) and gamma-manganese dioxide (e.g., $\gamma$-$MnO_2$) and an anode including zinc. The gamma-manganese dioxide can be a chemically-produced manganese dioxide (CMD), an electrochemically-produced manganese dioxide (EMD) or a mixture of CMD and EMD. The alkaline battery can have improved initial discharge performance and improved capacity retention after storage, compared to alkaline batteries containing either lambda-manganese dioxide or gamma-manganese dioxide as the sole active cathode material. Further, the specific discharge capacity of the battery to a 0.8V cutoff is greater than that for batteries having cathodes containing gamma-manganese dioxide as the only active cathode material. Batteries having cathodes containing a mixture of lambda-manganese dioxide and gamma-manganese dioxide powders in various weight ratios also can provide higher pressed pellet densities as well as higher values of bulk electrical conductivity for a given level of conductive additive than cathodes containing lambda-manganese dioxide as the sole active cathode material.

In one aspect, an alkaline battery includes a cathode including lambda-manganese dioxide and gamma-manganese dioxide, an anode including zinc, a separator between the anode and the cathode, and an alkaline electrolyte contacting the anode and the cathode.

In another aspect, a method of manufacturing an alkaline battery includes providing a positive electrode including lambda-manganese dioxide and gamma-manganese dioxide, and forming a battery including the positive electrode and a negative electrode including zinc particles. Providing the positive electrode can include preparing lambda-manganese dioxide by contacting water with a lithium manganese oxide compound, adding an acid to the water and the compound to form a mixture until the mixture has a pH of 1 or less, separating a solid from the water and acid, and drying the solid, at a temperature of 150° C. or lower, optionally in vacuo, to obtain lambda-manganese dioxide. The lithium manganese oxide compound can have a spinel structure and can have a nominal composition of $LiMn_2O_4$. Contacting water and the compound can include forming a slurry. The slurry can be maintained at a temperature between about 5° C. and 50° C. The temperature of the slurry can be maintained substantially constant during the acid addition. The acid can be a strong acid. The strong acid can be, for example, sulfuric acid, nitric acid, perchloric acid, hydrochloric acid, toluene sulfonic acid, or trifluoromethyl sulfonic acid. The acid concentration can be between 1 and 8 molar. The final pH of the slurry including water, the compound, and the acid can be 1 or less, 0.7 or less, or preferably between 0.5 and 0.7. The method can include washing the solid separated from the water and acid with water until the washings have a pH of between 6 and 7. The water can be distilled or de-ionized. The solid can be dried at a temperature between 20° C. and 150° C., between 30° C. to 120° C. or between 60° C. and 80° C. The solid can be dried while a vacuum is applied.

The relative weight fraction of lambda-manganese dioxide in the positive electrode can be equal to or substantially less than that of gamma-manganese dioxide. The lambda-manganese dioxide can serve as a minority additive to a cathode containing predominantly gamma-manganese dioxide as the active cathode material. The weight fraction of lambda-manganese dioxide in the positive electrode can be between 5 wt % and 45 wt %.

The lambda-manganese dioxide can have a B.E.T. specific surface area of between 1 and 10 $m^2/g$ (e.g., greater than about 8 $m^2/g$), a total pore volume of between 0.05 and 0.15 cubic centimeters per gram (e.g., 0.05 to 0.15 cubic centimeters per gram) or an average pore size of less than 100 Å.

Other features and advantages of the invention will be apparent from the description and drawings, and from the claims.

DETAILED DESCRIPTION

Figure 1:
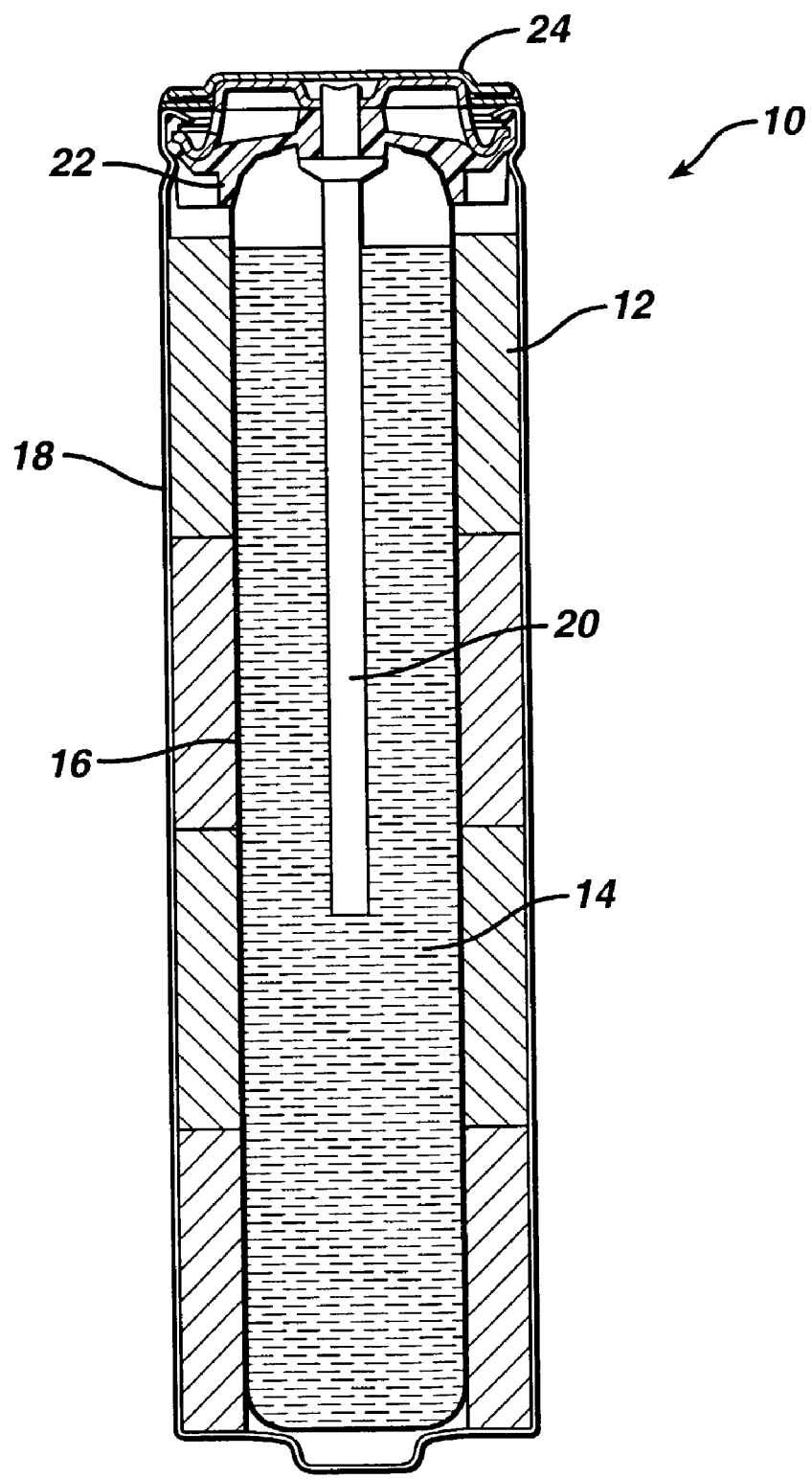
FIG. 1 is a cross-section view of a battery.

Referring to the FIG. 1, battery 10 includes a cathode 12 (positive electrode), an anode 14 (negative electrode), a separator 16 and a cylindrical housing 18. Battery 10 also includes current collector 20, seal 22, and a negative metal top cap 24, which serves as the negative terminal for the battery. The cathode is in contact with the housing, and the positive terminal of the battery is at the opposite end of the battery from the negative terminal. An electrolytic solution is dispersed throughout battery 10. Battery 10 can be, for example, an AA, AAA, AAAA, C, or D type cylindrical battery or a button cell. Battery 10 can be a prismatic battery, a thin, rigid cell, such as a coin cell or a thin, flexible cell such as a pouch, envelope or bag cell.

Anode 14 can be formed of any of the standard zinc materials used in battery anodes. For example, anode 14 can be a zinc slurry that can include zinc metal particles, a gelling agent, and minor amounts of additives, such as a gassing inhibitor. In addition, a portion of the electrolyte solution can be dispersed throughout the anode.

The zinc particles can be any of the zinc particles conventionally used in slurry anodes. Examples of zinc particles can include those described in U.S. application Ser. No. 08/905,254, U.S. application Ser. No. 09/115,867, or U.S. application Ser. No. 09/156,915, each of which is hereby incorporated by reference in its entirety. The anode can include, for example, between 60 wt % and 80 wt %, between 65 wt % and 75 wt %, or between 67 wt % and 71 wt % of zinc particles.

The electrolyte can be an aqueous solution of an alkali hydroxide, such as potassium hydroxide, sodium hydroxide or a mixture thereof. The electrolyte can contain between 15 wt % and 60 wt %, between 20 wt % and 55 wt %, or between 30 wt % and 50 wt % alkali hydroxide dissolved in water. The electrolyte can contain 0 wt % to 6 wt % of a metal oxide, such as zinc oxide. The addition of electrolyte to the cell can be assisted by application of vacuum to the cell, thereby assisting electrolyte penetration into the cathode and separator. Application of vacuum during assembly of the cell can improve cell performance.

Examples of a gelling agent can include a polyacrylic acid, a grafted starch material, a salt of a polyacrylic acid, a carboxymethylcellulose, a salt of a carboxymethylcellulose (e.g., sodium carboxymethylcellulose) or combinations thereof. Examples of a polyacrylic acid include CARBOPOL 940 and 934 (available from B.F. Goodrich) and POLYGEL 4P (available from 3M), and an example of a grafted starch material includes WATERLOCK A221 or A220 (available from Grain Processing Corporation, Muscatine, Iowa). An example of a polyacrylic acid salt includes ALCOSORB G1 (available from Ciba Specialties). The anode can include, for example, between 0.05 wt % and 2 wt %, or between 0.1 wt % and 1 wt % gelling agent.

A gassing inhibitor can include an inorganic material, such as bismuth, tin, or indium, for example, in the form of an alloy with zinc. Alternatively, a gassing inhibitor can include an organic compound, such as a phosphate ester, an ionic surfactant or a nonionic surfactant. Examples of ionic surfactants are disclosed in, for example, U.S. Pat. No. 4,777,100, which is hereby incorporated by reference in its entirety.

Separator 16 can be a conventional battery separator. In some embodiments, separator 16 can be formed of two layers of non-woven, non-membrane material with one layer being disposed along a surface of the other. For example, to minimize the volume of separator 16 while providing an efficient battery, each layer of non-woven, non-membrane material can have a basic weight of about 54 grams per square meter, a thickness of about 5.4 mils when dry and a thickness of about 10 mils when wet. The layers can be substantially devoid of fillers, such as inorganic particles.

In other embodiments, separator 16 can include a layer of cellophane combined with a layer of non-woven material. The separator also can include an additional layer of non-woven material. The cellophane layer can be adjacent to cathode 12. The non-woven material can contain from 78 wt % to 82 wt % polyvinyl alcohol and from 18 wt % to 22 wt % rayon with a trace amount of a surfactant, such as non-woven material available from PDM under the trade name PA25.

Housing 18 can be a conventional housing commonly used for primary alkaline batteries. The housing can include an inner metal wall and an outer electrically non-conductive material such as a heat shrinkable plastic. Optionally, a layer of conductive material can be disposed between the inner wall and cathode 12. The layer can be disposed along the inner surface of the inner wall, along the circumference of cathode 12, or both. The conductive layer can be formed, for example, of a carbonaceous material (e.g., colloidal graphite), such as LB1000 (Timcal), Eccocoat 257 (W.R. Grace & Co.), Electrodag 109 (Acheson Colloids Company), Electrodag EB-009 (Acheson), Electrodag 112 (Acheson) and EB0005 (Acheson). Methods of applying the conductive layer are disclosed in, for example, Canadian Patent No. 1,263,697, which is hereby incorporated by reference in its entirety. The conductive layer can include a conductive metal, such as gold, silver or nickel deposited, for example, by an electroless deposition process.

Current collector 28 can be made from a suitable metal, such as brass. Seal 30 can be made from a suitable polymeric material, for example, nylon.

Cathode 12 includes active cathode material and conductive carbon particles. Optionally, cathode 12 can also include an oxidative additive or a binder, or both. Generally, the cathode can include, for example, between 60% by weight and 97% by weight, between 80% by weight and 95% by weight, or between 85% by weight and 90% by weight of active cathode material.

The conductive carbon particles can include graphite particles. The graphite particles can be synthetic graphite particles, including expanded graphite, non-synthetic, or natural graphite, or a blend thereof. Suitable graphite particles can be obtained from, for example, Brazilian Nacional de Grafite of Itapecerica, MG Brazil (e.g., NdG grade MP-0702X), Chuetsu Graphite Works, Ltd. (e.g., Chuetsu grades WH-20A and WH-20AF) of Japan, Timcal America of Westlake, Ohio (e.g., Timcal grade EBNB-90) or Superior Graphite Co. (Chicago, Ill.). The cathode can include, for example, between 1 wt % and 40 wt %, between 2 wt % and 10 wt %, or between 3 wt % and 8 wt % of graphite particles or a blend of graphite particles. A comparison of discharge curves for button cells with cathodes containing a 1:1 admixture of lambda-manganese dioxide and EMD and either 35 wt % natural graphite or 8 wt % natural graphite indicates that for low discharge rates (e.g., C/30 and C/40), the discharge capacities of cells with cathodes containing 8 wt % graphite relative to those containing 35 wt % graphite are 87% and 84% to 1V and 0.8V cell cutoff voltages, respectively. For cathodes having low graphite levels (e.g., <10 wt %), a portion of the natural graphite ranging from 10 to 90% by weight, from 25 to 75% by weight, or from 40 to 60% by weight can be substituted by an expanded graphite.

The cathode also can include a low-solubility manganate salt, for example, barium manganate, copper manganate, or silver manganate or an oxidative additive, such as, for example, a peroxide salt (e.g., potassium peroxide, sodium peroxide, or barium peroxide), a superoxide salt (e.g., potassium superoxide) or silver oxide.

Examples of binders can include a polymer such as, for example, polyethylene, polyacrylamide, or a fluorocarbon resin, such as polyvinylidenefluoride (PVDF) or polytetrafluoroethylene (PTFE). An example of a suitable polyethylene binder is sold under the trade name COATHYLENE HA-1681 (available from Hoechst). The cathode can include, for example, between 0.05 wt % and 5 wt %, or between 0.1 wt % and 2 wt % binder.

A portion of the electrolyte solution can be disposed throughout cathode 12, and the weight percentages provided above and below are determined after electrolyte solution has been so disposed.

The cathode material includes lambda-manganese dioxide and gamma-manganese dioxide. The gamma-manganese dioxide can be CMD or EMD or a mixture thereof. Weight ratios of lambda-manganese dioxide to gamma-manganese dioxide in cathodes containing admixtures of gamma-manganese dioxide and lambda-manganese dioxide can range from 1:19 to 3:1, from 1:9 to 1:1, or from 1:3 to 1:1. Cathodes containing admixtures of lambda-manganese dioxide and EMD can provide increased low-rate capacity in alkaline cells for a relatively modest increase in materials cost. Cathodes containing admixtures of lambda-manganese dioxide and EMD can be more compatible with current cell building processes than cathodes containing only lambda-manganese dioxide. Cathode mixes containing admixtures of lambda-manganese dioxide and EMD can be prepared manually with a mortar and pestle or mechanically with standard commercial mixing equipment such as a ball mill, blade mill, vibroenergy mill, or using mechanochemical processing methods, as disclosed in co-pending U.S. Ser. No. 09/768,138, filed Jan. 23, 2001, which is incorporated by reference in its entirety. When discharged at a C/30 rate, button cells with cathodes containing admixtures of lambda-manganese dioxide and EMD gave unexpectedly greater capacities to a 0.8V cutoff voltage as well as higher initial closed circuit voltage (CCV) values than cells with cathodes containing only EMD. However, cells containing admixtures of lambda-manganese dioxide and EMD can provide discharge curve profiles more similar to those for cells containing only lambda-manganese dioxide than cells containing only EMD. The initial high CCV values and the improved discharge voltage profiles for cells with cathodes containing admixtures of lambda-manganese dioxide and EMD can result from an increase in average oxidation state for the manganese in the EMD produced by oxidation of $Mn^{+3}$ to $Mn^{+4}$ ions by manganate ions generated, for example, via disproportionation of lambda-manganese dioxide in alkaline electrolyte.

The lambda-manganese dioxide to EMD weight ratio of the admixture in the cathode can affect the relative discharge capacity of cells stored at 60° C. for various lengths of time (e.g., 18 hours, 1 week, 2 weeks, 4 weeks) substantially. The percentage relative capacity loss is defined as equal to: [1-(stored capacity/fresh capacity)]×100%. The average relative capacity loss for button cells with cathodes containing EMD as the sole active cathode material typically was about 5% after 18 hours and about 10% after 4 weeks at 60° C. By contrast, the average relative capacity loss for button cells with cathodes containing lambda-manganese dioxide as the sole active material was about 20% after 18 hours and nearly 35% after 4 weeks storage at 60° C. Cells with cathodes containing admixtures with lambda-manganese dioxide to EMD weight ratios of less than about 1:1 can have lower relative capacity losses than cells with cathodes containing only lambda-manganese dioxide. For example, cathodes containing an admixture with a lambda-manganese dioxide to EMD weight ratio of about 1:3 can have a relative capacity loss of only about 5% after 18 hours and about 10% after 1 week storage at 60° C. Specific (i.e., gravimetric) discharge capacities to a 0.8V cutoff voltage for cells containing lambda-manganese dioxide were about 113% of that for cells with cathodes containing EMD as the sole active cathode material. A specific discharge capacity greater than about 309 mAh/g is particularly significant since this value corresponds to the theoretical one-electron capacity for manganese dioxide.

An initial drop in closed circuit voltage (CCV) of about 150 to 250 mV can occur during the discharge of cells with cathodes containing lambda-manganese dioxide as the sole active cathode material. A voltage decrease can result from a rapid reduction of manganate ions in solution followed by a reduction of bulk $\lambda\text{-MnO}_2$. Manganate ions can be generated via a side-reaction occurring during reductive insertion of lithium ions from a concentrated aqueous LiOH solution having high pH into lambda-manganese dioxide (See, for example, Kanzaki et al., J. Electrochem. Soc., vol. 138, no. 1, 1991, pp. 333–4; Ammundsen et al., Chem. Mater., vol. 8, 1996, pp. 2799–2808). Both manganate and permanganate ions can be generated readily by introduction of acid-treated EMD into concentrated (i.e., 3–9N) KOH electrolyte either with or without heating (See, for example, Kozawa, J. Electrochem. Soc. Japan, vol. 44, no. 8, 1976, pp. 145–156). Similarly, in a concentrated alkaline electrolyte solution, lambda-manganese dioxide can disproportionate to form soluble manganate ions and groutite (i.e., $\alpha\text{-MnOOH}$) according to Equation 1:

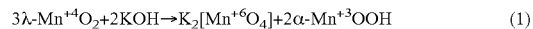

$$3\lambda\text{-Mn}^{+4}O_2 + 2KOH \rightarrow K_2[\text{Mn}^{+6}O_4] + 2\alpha\text{-Mn}^{+3}OOH \qquad (1)$$

Permanganate ion also can be formed via a similar disproportionation reaction. However, permanganate ion can oxidize the KOH electrolyte, thereby forming manganate ion. Groutite is known to be stable in KOH electrolyte solution. Manganate ions can diffuse through typical alkaline separators and be reduced on the zinc anode thereby causing self-discharge in alkaline cells containing lambda-manganese dioxide. Storage stability of alkaline cells with cathodes containing lambda-manganese dioxide can be improved substantially either by inhibiting formation of both permanganate and manganate ions or by chemically reducing the permanganate and manganate ions to insoluble manganese (+4) compounds inside the cathode. The presence of EMD admixed with lambda-manganese dioxide in the cathode can serve to reduce the permanganate and manganate ions to insoluble manganese (+4) compounds thereby minimizing migration of manganese out of the cathode to the anode. Thus, the amount of lambda-manganese dioxide in the admixture should be minimized.

The lambda-manganese dioxide can be synthesized by an oxidative delithiation process from a lithium manganese oxide precursor having a spinel-type crystal structure that can be prepared by various synthetic methods. The lambda-manganese dioxide can have a nominally stoichiometric composition of $LiMn_2O_4$ with specific physical properties. A suitable lithium manganese oxide spinel can be prepared as described in, for example, U.S. Pat. Nos. 4,246,253; 4,507,371; 4,828,834; 5,245,932; 5,425,932; 5,997,839; 6,207,129 or U.S. Ser. No. 09/988,297, filed Nov. 19, 2001, each of which is incorporated by reference in its entirety. A nominally stoichiometric lithium manganese oxide spinel can have the general formula $Li_{1+x}Mn_{2-x}O_4$, where x is between −0.05 and +0.05, preferably between −0.02 and +0.02, more preferably between −0.005 and +0.005. A suitable lithium manganese oxide spinel can be obtained, for example, from Kerr-McGee Chemical Company, (Oklahoma City, Okla.), Carus Chemical Company, (Peru, Ill.), Konoshima Chemical Co. (Osaka, Japan) or Erachem-Comilog Inc. (Baltimore, Md.).

Physical, microstructural, and chemical properties for some commercial samples of $LiMn_2O_4$-type spinels obtained from several commercial suppliers are summarized in Table 1. X-ray powder diffraction (XPD) patterns for the $LiMn_2O_4$ powders were measured using a Rigaku Miniflex diffractometer using Cu $K_\alpha$ radiation. For example, lithium manganese oxide spinel powder obtained from one supplier (Spinel B) gives a refined cubic lattice cell constant, $a_o$, and has a chemical composition very close to that for stoichiometric $LiMn_2O_4$. The reported (e.g., ICDD PDF No. 35-0782) cubic lattice constant for stoichiometric $LiMn_2O_4$ spinel is 8.248 Å. However, another commercial lithium manganese oxide spinel powder (Spinel A) has an XPD pattern that gives a refined cubic lattice constant of 8.231 Å. This $a_0$ value is more consistent with those values typically reported for lithium manganese oxide spinels with a composition having a slight excess of lithium (i.e., $Li_{1+x}Mn_{2-x}O_4$, where x is between 0.005 and 0.1). The $a_0$ values for such lithium-excess manganese oxide spinels typically decrease linearly as x increases for x values between −0.15 and 0.25. See, for example, U.S. Pat. No. 5,425,932, which is incorporated by reference in its entirety.

The oxidative delithiation process can include, for example, the following steps:

1. A slurry of a stoichiometric $LiMn_2O_4$ spinel powder is formed with stirring in distilled or deionized water and adjusted to a temperature between about 10 and 50° C., preferably between about 15° C. and 30° C.;

2. An aqueous solution of an acid, such as, for example, sulfuric acid, nitric acid, hydrochloric acid, perchloric acid, toluenesulfonic acid or trifluoromethylsulfonic acid (e.g., having a concentration between 1 and 8 molar) is added with stirring to the slurry at such a rate so as to maintain a constant slurry temperature until the pH of the slurry stabilizes at a value typically below about 2, below about 1, or below about 0.7, but greater than about 0.5, and held constant at this value for at least 0.75 hour (optionally, stirring can be continued for up to an additional 24 hours);

3. The solid product is separated from the supernatant liquid, for example, by suction filtration, pressure filtration, centrifugation or decantation, and is washed with aliquots of distilled or deionized water until washings have neutral pH (e.g., between about 6 and 7); and 4. The solid product is dried in vacuo for between 4 and 24 hours at 30 to 150° C., at 50 to 100° C. or at 60° C. to 80° C.

After processing, the dried solid typically exhibits a weight loss of about 27 wt % relative to the initial weight of the precursor $LiMn_2O_4$ spinel powder. The total lithium content of a stoichiometric $LiMn_2O_4$ spinel is about 4.3 wt %. The observed weight loss can be attributed to dissolution of lithium ions that migrated to the surface of the spinel particles from the interior as well as $Mn^{+2}$ ions produced via a disproportionation reaction. In the disproportionation reaction, $Mn^{+3}$ ions present in the spinel crystal lattice on the surface of the $LiMn_2O_4$ spinel particles are converted to soluble $Mn^{+2}$ ions that dissolve in the acid solution and insoluble $Mn^{+4}$ ions that remain on the surface according to Equation 2:

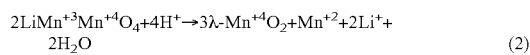

The XPD patterns for the lambda-manganese dioxide powders are consistent with that reported for lambda-manganese dioxide (e.g., ICDD PDF No. 44-0992). See, for example, U.S. Pat. No. 4,246,253, which is incorporated by reference in its entirety. The lattice constants, $a_0$, for the refined cubic unit cells for the samples of lambda-manganese dioxide prepared by the process described hereinabove are given in Table 1. The $a_0$ values range between 8.035 and 8.048 Å. Comparison of XPD patterns for $\lambda$-$MnO_2$ produced by acid treatment of a $LiMn_2O_4$ spinel powder with that for the spinel shows that the XPD pattern for lambda-manganese dioxide is clearly distinguishable because of shifts in the relative positions of the diffraction peaks to higher 2θ angles.

The precursor spinel can have a nominally stoichiometric composition, for example, a composition having the general formula $Li_{1+x}Mn_{2-x}O_4$, where x is from −0.02 to +0.02, such as $Li_{1.01}Mn_{1.99}O_4$, from which more lithium ions can be removed by oxidative delithiation and not by replacement of lithium ions with protons via an ion-exchange reaction. Lithium manganese oxide spinels having an excess of lithium ions and the general formula $Li_{1+x}Mn_{2-x}O_4$ can be described by an alternative formula as $[Li]_{tet}[Mn_{2-x}Li_x]_{oct}O_4$, where $0.02<x<0.33$. In this representation, the majority of the lithium ions are located in tetrahedral lattice sites and the excess lithium ions are located in octahedral lattice sites corresponding to $Mn^{+3}$ vacancies in the spinel crystal lattice. During acid treatment, both disproportionation of the $Mn^{+3}$ ions and oxidative delithiation can take place according to Equation 3.

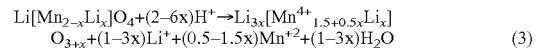

The resulting intermediate reaction product can be described by the general formula $Li_{3x}[Mn^{4+}_{1.5+0.5x}Li_x]O_{3+3x}$. The remaining 3x lithium ions located in be ion-exchanged by protons during subsequent acid treatment resulting in insertion of protons into tetrahedral $\lambda$-$MnO_2$ lattice sites according to Equation 4. It is generally thought that substitution of the lithium ions in tetrahedral lattice sites by protons can cause thermal instability and decreased capacities for cells including such materials. Further, some un-exchanged lithium ions can remain in octahedral sites in the lambda-manganese dioxide lattice.

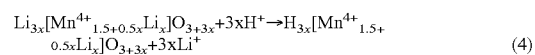

Specific surface areas of various lambda-manganese dioxide powders were determined by measuring multipoint nitrogen adsorption isotherms using the B.E.T. method as described by P. W. Atkins in "Physical Chemistry", 5$^{th}$ ed., New York: W. H. Freeman & Co., 1994, pp. 990–2. The values for B.E.T. specific surface area for the lambda-manganese dioxide powders were found to be substantially greater than those for the corresponding spinel powders (Table 1). The increased surface area is consistent with an apparent increase in roughness or porosity of the surface microstructure of the particles that can be observed by comparing SEM micrographs (10,000×) of the spinel particles and the corresponding lambda-manganese dioxide particles. For example, porosimetric measurements of Spinel B powder and the corresponding lambda-manganese dioxide powder revealed that total pore volume more than doubled after formation of lambda-manganese dioxide and that average pore size decreased by nearly 80%.

TABLE 1

| Precursor Spinel | Spinel A | Spinel B |
|---|---|---|
| Lattice constant, $a_0$ Spinel (Å) | 8.231 | 8.242 |
| Lattice constant, $a_0$ $\lambda$-$MnO_2$ (Å) | 8.048 | 8.035 |

TABLE 1-continued

| Precursor Spinel | Spinel A | Spinel B |
|---|---|---|
| B.E.T. SSA, Spinel (m$^2$/g) | 0.44 | 3.43 |
| B.E.T. SSA, λ-MnO$_2$ (m$^2$/g) | 4.98 | 8.30 |
| Average particle size, Spinel (μm) | 12 | 14.6 |
| Average Pore Size, Spinel (Å) | — | 157 |
| Average Pore Size, λ-MnO$_2$ (Å) | — | 36.5 |
| Total Pore Volume, Spinel (cc/g) | — | 0.05 |
| λ-MnO$_2$ Total Pore Volume (cc/g) | — | 0.11 |
| Tap Density, Spinel (g/cm$^3$) | 2.10 | 2.08 |
| True Density, Spinel (g/cm$^3$) | 4.225 | 4.196 |
| True Density, λ-MnO$_2$ (g/cm$^3$) | 4.480 | 4.442 |
| Spinel Stoichiometry, Li$_{1+x}$Mn$_{2-x}$O$_4$, x = ? | 0.06–0.08 | 0.01 |

In certain embodiments, suitable precursor spinels that permit preparation of a lambda-manganese dioxide powder can be selected according to the following selection criteria: (1) general chemical formula is Li$_{1+x}$Mn$_{2-x}$O$_4$ wherein x ranges from −0.05 to +0.05, preferably from −0.02 to +0.02, more preferably from −0.005 to +0.005; (2) B.E.T. surface area of the spinel powder is between about 2 and 10 m$^2$/g; (3) total pore volume of the spinel powder is between about 0.02 and 0.1 cubic centimeters per gram; and (4) average pore size of the spinel powder is between about 100 and 300 Å.

The thermal stability of the lambda-manganese dioxide powder prepared from Spinel B powder as described above was evaluated in order to determine the effects of various thermal treatments during cathode fabrication (e.g., drying, coating, pressing, etc.) on cell performance. The temperature of an aqueous slurry of the spinel powder can be maintained below about 55° C. during the delithiation process to minimize formation of undesirable manganese oxide side products. See, for example, Larcher et al. (Journal of the Electrochemical Society, vol. 145, no. 10, 1998, pp. 3393–3400) which is incorporated by reference in its entirety. The undesirable side products can be formed by re-oxidation of soluble Mn$^{+2}$ ions by oxygen at temperatures above about 55° C.

The XPD pattern for a sample of lambda-manganese dioxide powder after heating in vacuo at 150° C. for 4 hours was found to be identical to that for a sample of lambda-manganese dioxide powder originally dried in vacuo at 70° C. for up to 16 hours, indicating adequate thermal stability to permit drying at 150° C. The XPD pattern for a sample of λ-MnO$_2$ powder heated in vacuo at 180° C. for 4 hours exhibited a slight broadening of the characteristic λ-MnO$_2$ peaks as well as the appearance of a new broad peak at a 2θ angle of about 20° indicating onset of decomposition of the λ-MnO$_2$ phase. Heating a sample of λ-MnO$_2$ powder in vacuo at 210° C. for 4 hours resulted in complete disappearance of the characteristic λ-MnO$_2$ peaks and the appearance of several broad peaks in the XPD pattern suggesting the formation of one or more new phases. Even though these new peaks are poorly resolved, they can be attributed to β-MnO$_2$ and possibly ε-MnO$_2$ phases.

In addition to evaluating the thermal stability of lambda-manganese dioxide powder alone, the thermal stability of pressed composite cathodes containing lambda-manganese dioxide, conductive carbon particles and a polymeric binder was evaluated. XPD patterns for pressed composite cathodes heated at 120° C. for 4 hours showed a broadening of the lambda-manganese dioxide peaks as well as the appearance of several additional, weak, broad peaks possibly attributable to β-MnO$_2$ and ε-MnO$_2$ indicating the onset of decomposition of the lambda-manganese dioxide. Thus, lambda-manganese dioxide in a pressed composite cathode can decompose at an even lower temperature than lambda-manganese dioxide powder alone. XPD patterns for cathodes heated at 150° C. or 180° C., revealed that all the peaks characteristic of lambda-manganese dioxide disappeared. Unlike the case of λ-MnO$_2$ powder, peaks characteristic of β-MnO$_2$ could not be discerned for a composite cathode containing lambda-manganese dioxide heated at 180° C.

Batteries (e.g., button cells) including lambda-manganese dioxide and gamma-manganese dioxide in the cathode were prepared according to the following examples.

EXAMPLE 1

Approximately 120 g of a stoichiometric lithium manganese oxide spinel having a nominal composition of Li$_{1.01}$Mn$_{1.99}$O$_4$ (Carus Chemical Co.) was added with stirring to about 200 ml distilled water to form a slurry that was cooled to 15° C., and 6M H$_2$SO$_4$ added dropwise with constant stirring until the pH stabilized at about 0.7 and remained constant at this value for about 45 minutes. The rate of acid addition was adjusted to maintain the temperature of the slurry at about 15° C. The slurry was stirred for an additional 16 hours at pH 0.7. A solid was separated from the liquid by filtration and thoroughly washed with de-ionized water until the washings were neutral (viz., pH about 6). The solid was dried in vacuo for 4 to 16 hours at between 50 and 90° C. The weight of the dried lambda-manganese dioxide powder was about 87 g, corresponding to a weight loss of about 27.5%.

A sample of the dried lambda-manganese dioxide powder was blended with EMD (Kerr-McGee, Trona D) in a weight ratio of 1:1 to form an admixture. The admixture of lambda-manganese dioxide and EMD was mixed with natural graphite (Nacionale de Grafite, MP-0702X) and electrolyte solution (containing 38 wt % KOH, 2 wt % zinc oxide) in a weight ratio of 60:35:5. About 0.5 g of this wet mixture was pressed directly into a button cell can to form the cathode. A separator disk including a layer of cellophane attached to a layer of non-woven polymeric material (e.g., "Duralam" or PDM "PA25") saturated with electrolyte was positioned overlying the cathode. An excess of anode slurry was added and the cell assembly mechanically crimped to provide a hermetic seal.

Open circuit voltages (OCV) for the cells were measured immediately before discharge (i.e., "fresh") and are given in Table 2. Cells were discharged at low and high constant current values of 3 mA and 30 mA, nominally corresponding to C/30 and C/3 discharge rates for Examples 1a and 1b, respectively. A C/30 discharge rate corresponds to the rate at which the total cell capacity is discharged in 30 hours. A C/3 discharge rate corresponds to the rate at which total cell capacity is discharged in 3 hours. Gravimetric or specific discharge capacities (in units of mAhr/g) for fresh cells discharged continuously at each of the rates to cutoff voltages of 1V and 0.8V are given in Table 2. Cells were tested fresh and after storage in an oven at 60° C. for 18 hours, 1 week, 2 weeks and 4 weeks. The average specific capacity to a 0.8V cutoff obtained for fresh cells of Example 1 a is about 6% greater than that obtained for comparable fresh cells discharged at the same rate having cathodes containing only EMD. Fresh cells of Example 1a provide an overall discharge profile quite similar to cells containing 60 wt %

Figure 2:
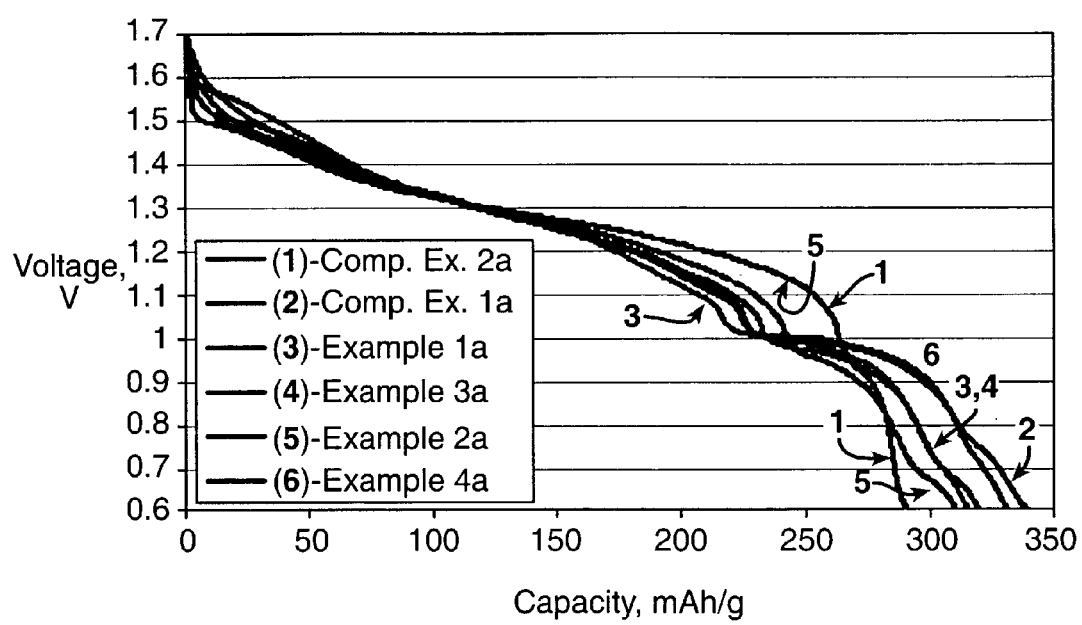
FIG. 2 is a graph depicting a comparison of discharge curves for alkaline button cells with cathodes containing lambda-manganese dioxide or gamma-manganese dioxide or admixtures of lambda-manganese dioxide and gamma-manganese dioxide discharged at a low-rate (i.e., C/30).
Figure 3:
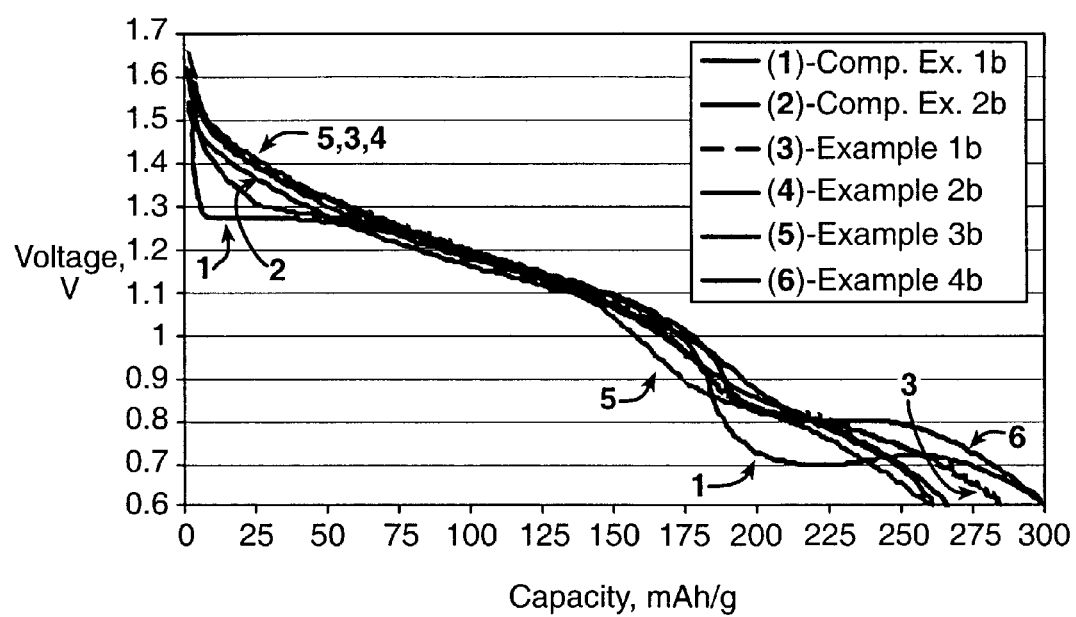
FIG. 3 is a graph depicting a comparison of discharge curves for alkaline button cells with cathodes containing lambda-manganese dioxide or gamma-manganese dioxide or admixtures of lambda-manganese dioxide and gamma-manganese dioxide discharged at a high-rate (i.e., C/3).

$\lambda$-MnO$_2$ and 35 wt % natural graphite (viz., Comparative Example 1a). FIG. 2 is a graph depicting a comparison of discharge curves for alkaline button cells with cathodes containing: 60 wt % of 1:9, 1:3, 1:1 or 3:1 admixtures of $\lambda$-MnO$_2$ and EMD and 35 wt % natural graphite; 60 wt % $\lambda$-MnO$_2$ and 35 wt % natural graphite; and 60 wt % EMD and 35 wt % natural graphite. All the cells in FIG. 2 were discharged at a nominal C/30 rate (i.e., 3 mA) to a final 0.6V cutoff voltage. A substantial increase in the initial closed circuit voltage (CCV) for about the first 25% of the discharge curve is observed for the cells with cathodes containing admixtures of lambda-manganese dioxide and EMD. Fresh cells of Example 1b gave specific capacities to 0.8V that were comparable to those for cells with cathodes containing 60 wt % EMD and 35 wt % natural graphite. FIG. 3 is a graph depicting a comparison of the discharge curves for cells with cathodes containing: 60 wt % of 1:9, 1:3, 1:1 or 3:1 admixtures of lambda-manganese dioxide and EMD and 35 wt % natural graphite; 60 wt % lambda-manganese dioxide and 35 wt % natural graphite; and 60 wt % EMD and 35 wt % natural graphite. All the cells in FIG. 3 were discharged at a nominal C/3 rate (i.e., 30 mA) to a final 0.6V cutoff voltage. Although not as dramatic as for the cells of Example 1a, nearly all the cells of Example 1b provided higher initial CCV than the corresponding cells of Comparative Example 1. The average values for specific capacities and cumulative percentage capacity losses after storage at 60° C. for the cells of Example 1a are given in Table 3. The percentage capacity loss was calculated as the relative difference between the initial capacity of cells discharged fresh and the capacity of cells discharged after storage at 60° C. For example, after 18 hours storage at 60° C., the average specific capacity of the cells of Example 1a had decreased to about 89% of that for the corresponding fresh cells. After 1 week at 60° C., the average specific capacity decreased to about 83% of that for fresh cells. After 4 weeks at 60° C. the average specific capacity appeared to have stabilized at about 82% of that for fresh cells.

TABLE 2

| Ex. No. | $\lambda$-MnO$_2$ (wt %) | Total Graphite Level (wt %) | Discharge Rate | Ave OCV (V) | Capacity to 1 V (mAh/g) | Capacity to 0.8V (mAh/g) |
|---|---|---|---|---|---|---|
| C2a | 0 | 35 | C/30 | 1.60 | 262 | 282 |
| 2a | 10 | 35 | C/30 | 1.65 | 245 | 282 |
| 3a | 25 | 35 | C/30 | 1.70 | 242 | 294 |
| 1a | 50 | 35 | C/30 | 1.64 | 229 | 299 |
| 4a | 75 | 35 | C/30 | 1.64 | 230 | 311 |
| C1a | 100 | 35 | C/30 | 1.65 | 233 | 312 |
| C3a | 0 | 4 + 4 | C/40 | 1.62 | 207 | 237 |
| 5a | 50 | 4 + 4 | C/40 | 1.65 | 141 | 176 |
| C2a | 100 | 4 + 4 | C/40 | 1.71 | 203 | 263 |
| 6a | 50 | 8 | C/40 | 1.66 | 199 | 251 |
| C4a | 100 | 8 | C/40 | 1.73 | 196 | 220 |
| C2b | 0 | 35 | C/3 | 1.60 | 164 | 215 |
| 2b | 10 | 35 | C/3 | 1.65 | 167 | 221 |
| 3b | 25 | 35 | C/3 | 1.70 | 156 | 206 |
| 1b | 50 | 35 | C/3 | 1.65 | 159 | 206 |
| 4b | 75 | 35 | C/3 | 1.64 | 165 | 200 |
| C1b | 100 | 35 | C/3 | 1.66 | 167 | 187 |
| C3b | 0 | 4 + 4 | C/4 | 1.62 | 144 | 156 |
| 5b | 50 | 4 + 4 | C/4 | 1.65 | 147 | 154 |
| C2b | 100 | 4 + 4 | C/4 | — | — | — |
| 6b | 50 | 8 | C/4 | 1.66 | 142 | 149 |
| C4b | 100 | 8 | C/4 | 1.73 | 142 | 146 |

TABLE 3

| Ex. No. | $\lambda$-MnO$_2$ (wt %) | Storage Time at 60° C. (wks) | Ave OCV (V) | Capacity to 0.8 V at C/30 (mAh/g) | Cumulative Capacity Loss (%) |
|---|---|---|---|---|---|
| C2a | 0 | 0 | 1.60 | 282 | — |
|  | 0 | 0.11 | 1.575 | 266 | 5 |
|  | 0 | 1 | 1.56 | 260 | 7 |
|  | 0 | 2 | 1.52 | 258 | 8.5 |
|  | 0 | 4 | 1.50 | 254 | 10 |
| 2a | 10 | 0 | 1.64 | 282 | — |
|  | 10 | 0.11 | 1.59 | 260 | 7 |
| 3a | 25 | 0 | 1.66 | 290 | — |
|  | 25 | 0.11 | 1.60 | 275 | 5 |
|  | 25 | 1 | 1.56 | 260 | 10 |
|  | 25 | 2 | — | — | — |
|  | 25 | 4 | 1.50 | 224 | 14 |
| 1a | 50 | 0 | 1.65 | 289 | — |
|  | 50 | 0.11 | 1.63 | 266 | 11 |
|  | 50 | 1 | 1.56 | 248 | 17 |
|  | 50 | 2 | 1.52 | 248 | 17 |
|  | 50 | 4 | 1.49 | 245 | 18 |
| 4a | 75 | 0 | 1.64 | 312 | — |
|  | 75 | 0.11 | 1.65 | 242 | 22 |

TABLE 3-continued

| Ex. No. | λ-MnO₂ (wt %) | Storage Time at 60° C. (wks) | Ave OCV (V) | Capacity to 0.8 V at C/30 (mAh/g) | Cumulative Capacity Loss (%) |
|---|---|---|---|---|---|
| C1a | 100 | 0 | 1.62 | 312 | — |
|  | 100 | 0.11 | 1.65 | 253 | 19 |
|  | 100 | 1 | 1.66 | 211 | 32 |
|  | 100 | 2 | 1.53 | 206 | 34 |
|  | 100 | 4 | 1.48 | 203 | 35 |

COMPARATIVE EXAMPLE 1

A sample of dried lambda-manganese dioxide powder prepared in the manner described in Example 1 was mixed with natural graphite (Nacionale de Grafite, MP-0702X) and electrolyte solution in a weight ratio of 60:35:5. Button cells were prepared using this wet mixture as described in Example 1.

OCV values measured immediately before discharge (i.e., "fresh") are given in Table 2. Cells were discharged at 3 mA and 30 mA constant current, nominally corresponding to C/30 and C/3 rates for Comparative Examples 1a and 1b, respectively. Cells were tested fresh and after storage for 18 hours, 1 week, 2 weeks and 4 weeks at 60° C. Average specific discharge capacities for fresh cells discharged to 1V and 0.8V cutoff voltages are given in Table 2. Specific capacities for fresh cells of Comparative Example I a were about 10% greater than those for comparable cells containing EMD instead of lambda-manganese dioxide when discharged at a C/30 rate to a 0.8V cutoff. Cells of Comparative Example 1b gave nearly the same capacity to a 1V cutoff as those containing EMD instead of lambda-manganese dioxide when discharged fresh at a C/3 rate. However, the capacity to a 0.8V cutoff was only about 95% of that for fresh cells containing EMD instead of lambda-manganese dioxide. Significantly, the cells of Comparative Example 1b typically had a substantially lower initial running voltage for the first 15–20% of the discharge curve than either the cells of Example 1b or those of Comparative Example 2b containing EMD instead of lambda-manganese dioxide. The average values for the specific capacities and the cumulative percentage capacity losses after storage at 60° C. for the cells of Comparative Example 1a are given in Table 3. For example, after 18 hours, 1 week, and 4 weeks storage at 60° C., the average specific capacity for cells of Comparative Example 1a decreased to about 81%, 68%, and 65%, respectively, of that for fresh cells. The cells of Comparative Example 1a containing only lambda-manganese dioxide exhibited the greatest loss of capacity after storage at 60° C. In addition, these cells gave the lowest average CCV after 18 hours storage at 60° C.

COMPARATIVE EXAMPLE 2

EMD (Kerr-McGee, Trona D) powder was mixed with natural graphite (Nacionale de Grafite, MP-0702X) and electrolyte solution in a weight ratio of 60:35:5. Button cells were prepared using this wet mixture as described in Example 1.

OCV values measured immediately before discharge are given in Table 2. Cells were discharged at 3 mA and 30 mA constant current, nominally corresponding to C/30 and C/3 rates for Comparative Examples 2a and 2b, respectively. Cells were tested fresh and after storage at 60° C. for 18 hours, 1 week, 2 weeks, and 4 weeks. Average specific discharge capacities for fresh cells discharged to 1V and 0.8V cutoff voltages are given in Table 2. Average specific capacities and cumulative percentage capacity losses after storage at 60° C. for cells of Comparative Example 2a are given in Table 3. For example, after 18 hours, 1 week, and 4 weeks storage at 60° C., the average specific capacities of the cells of Comparative Example 2a had decreased only to about 95%, 93%, and 90%, respectively, of that for fresh cells. Thus, the cells of Comparative Example 2a containing only EMD and no lambda-manganese dioxide lost a relatively small fraction of their capacity during storage at 60° C. Further, the cells of Comparative Example 2a also maintained their average CCV after storage at 60° C.

EXAMPLE 2

A sample of dried lambda-manganese dioxide powder prepared in the manner described in Example 1 was blended with EMD (Kerr-McGee, Trona D) in a weight ratio of 1:9 to form an admixture. The admixture of λ-MnO₂ and EMD was mixed with natural graphite (Nacionale de Grafite, MP-0702X) and electrolyte solution in a weight ratio of 60:35:5. Button cells were prepared using this wet mixture as described in Example 1.

Figure 4:
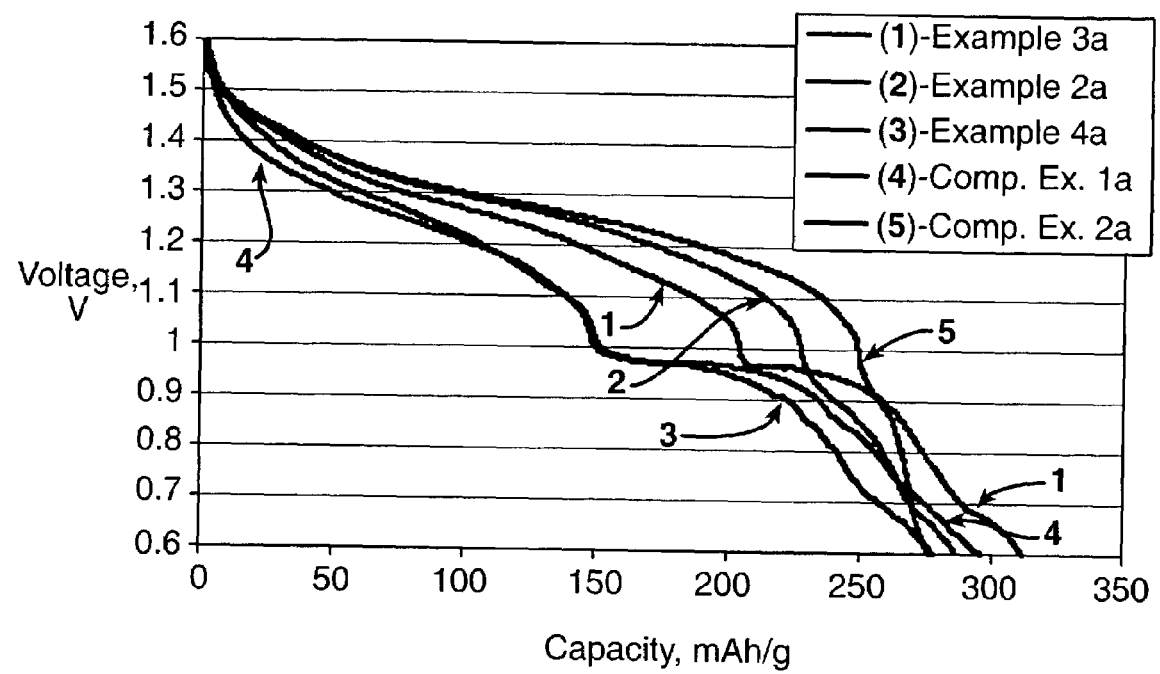
FIG. 4 is a graph depicting a comparison of discharge curves for alkaline button cells with cathodes containing lambda-manganese dioxide or gamma-manganese dioxide or admixtures of lambda-manganese dioxide and gamma-manganese dioxide discharged at a low-rate (i.e., C/3) after storage for 18 hours at 60° C.

OCV values measured immediately before discharge are given in Table 2. Cells were discharged at 3 mA and 30 mA constant current, nominally corresponding to C/30 and C/3 rates for Examples 2a and 2b, respectively. Average specific capacities for fresh cells discharged to 1V and 0.8V cutoff voltages are given in Table 2. Cells also were tested after storage for 18 hours at 60° C. After 18 hours storage at 60° C., the average specific capacity for cells of Example 2a decreased to about 93% of that for fresh cells as given in Table 3. FIG. 4 is a graph depicting a comparison of discharge curves for cells containing 60 wt % of various admixtures of lambda-manganese dioxide and EMD and 35 wt % natural graphite; 60 wt % lambda-manganese dioxide and 35 wt % natural graphite; and 60 wt % EMD and 35 wt % natural graphite after storage for 18 hours at 60° C. All cells in FIG. 4 were discharged at a nominal C/30 rate (i.e., 3 mA) to a final 0.6V cutoff voltage. The cells of Example 2a maintained their average CCV after 18 hours storage at 60° C. nearly as well as those of Comparative Example 2a.

EXAMPLE 3

A sample of dried lambda-manganese dioxide powder prepared in the manner described in Example 1 was blended with EMD (Kerr-McGee, Trona D) in a weight ratio of 1:3 to form an admixture. The admixture of lambda-manganese dioxide and EMD was mixed with natural graphite (Nacionale de Grafite, MP-0702X) and electrolyte solution in a weight ratio of 60:35:5. Button cells were prepared using this wet mixture as described in Example 1.

OCV values measured immediately before discharge are given in Table 2. Cells were discharged at 3 mA and 30 mA constant current, nominally corresponding to C/30 and C/3 rates for Examples 3a and 3b, respectively. Cells were tested fresh and after storage for 18 hours or 1, 2 or 4 weeks at 60° C. Average specific capacities for fresh cells discharged to 1V and 0.8V cutoff voltages are given in Table 2. Average specific capacities and cumulative percent capacity losses after storage at 60° C. for cells of Example 3a are given in Table 3. For example, after 18 hours, 1 week, and 4 weeks storage at 60° C., the average specific capacities for cells of Example 3a decreased to about 95%, 90%, and 85%, respectively, of that for the fresh cells. Further, the cells of Example 3a exhibited the lowest values for cumulative capacity loss after storage at 60° C. of all the cells containing admixtures of lambda-manganese dioxide and EMD. The cells of Example 3a did not appear maintain their average CCV after 18 hours storage at 60° C. as well as those of Example 2a. However, the average CCV values for the cells of Example 3a after storage at 60° C. were substantially better than those for the cells of Comparative Example 1a.

EXAMPLE 4

A sample of dried lambda-manganese dioxide powder prepared in the manner described in Example 1 was blended with EMD (Kerr-McGee, Trona D) in a weight ratio of 3:1 to form an admixture. The admixture of lambda-manganese dioxide and EMD was mixed with natural graphite (Nacionale de Grafite, MP-0702X) and electrolyte solution in a weight ratio of 60:35:5. Button cells were prepared from this wet mixture as described in Example 1.

OCV values measured immediately before discharge are given in Table 2. Cells were discharged at 3 mA and 30 mA constant current, nominally corresponding to C/30 and C/3 rates for Examples 4a and 4b, respectively. Cells were tested fresh and after storage for 18 hours or 1, 2 or 4 weeks at 60° C. Average specific capacities for fresh cells discharged to 1V and 0.8V cutoff voltages are given in Table 2. Average specific capacities and cumulative percent capacity losses after storage at 60° C. for cells of Example 4a are given in Table 3. For example, after 18 hours storage at 60° C., the average specific capacity for cells of Example 4a decreased to about 78% of that for fresh cells. However, these cells have average CCV values nearly as low as those for the cells of Comparative Example 1a.

EXAMPLE 5

A sample of dried $\lambda$-$MnO_2$ powder prepared in the manner described in Example 1 was blended with EMD (Kerr-McGee, Trona D) in a weight ratio of 1:1 to form an admixture. The admixture of lambda-manganese dioxide and EMD was mixed with another admixture including natural graphite (Nacionale de Grafite, MP-0702X) blended with expanded graphite (Timcal AG, EBNB90) in a weight ratio of 1:1 and with electrolyte solution in an overall weight ratio of 87:8:5. Button cells were prepared from this wet mixture of admixtures as described in Example 1.

OCV values for fresh cells measured immediately before discharge are given in Table 2. Cells were discharged at 3 mA and 30 mA, nominally corresponding to C/40 and C/4 rates for Examples 5a and 5b, respectively. Average specific capacities for fresh cells discharged continuously at C/40 and C/4 rates to 1V and 0.8V cutoffs are given in Table 2.

COMPARATIVE EXAMPLE 3

A sample of dried lambda-manganese dioxide powder prepared in the manner described in Example 1 was mixed with an admixture including natural graphite (Nacionale de Grafite, MP-0702X) blended with expanded graphite (Timcal AG, EBNB90) in a weight ratio of 1:1, and electrolyte solution in an overall weight ratio of 87:8:5. Button cells were prepared from this wet mixture as described in Example 1.

OCV values measured for fresh cells are given in Table 2. Cells were discharged at 3 mA and 30 mA, nominally corresponding to C/40 and C/4 discharge rates for Comparative Examples 3a and 3b, respectively. Average specific capacities for fresh cells discharged continuously at C/40 and C/4 rates to 1V and 0.8V cutoffs are given in Table 2.

COMPARATIVE EXAMPLE 4

A sample of commercial EMD (Kerr-McGee, Trona D) was mixed with an admixture including natural graphite (Nacionale de Grafite, MP-0702X) blended with expanded graphite (Timcal AG, EBNB90) in a weight ratio of 1:1 and electrolyte solution in an overall weight ratio of 87:8:5. Button cells were prepared from this wet mixture as described in Example 1.

OCV values measured for fresh cells are given in Table 2. Cells were discharged at 3 mA and 30 mA, nominally corresponding to C/40 and C/4 rates for Comparative Examples 4a and 4b, respectively. Average specific capacities for fresh cells discharged continuously at C/40 and C/4 rates to 1V and 0.8V cutoffs are given in Table 2.

EXAMPLE 6

A sample of dried lambda-manganese dioxide powder prepared in the manner described in Example 1 was blended with EMD (Kerr-McGee, Trona D) in a weight ratio of 1:1 to form an admixture. The admixture of lambda-manganese dioxide and EMD was mixed with natural graphite (Nacionale de Grafite, MP-0702X) and electrolyte solution in a weight ratio of 87:8:5. Button cells were prepared from this wet mixture as described in Example 1.

OCV values measured for fresh cells are given in Table 2. Cells were discharged at 3 mA and 30 mA, nominally corresponding to C/40 and C/4 rates for Examples 6a and 6b, respectively. Average specific capacities for fresh cells discharged continuously at C/40 and C/4 rates to 1V and 0.8V cutoffs are given in Table 2.

COMPARATIVE EXAMPLE 5

A sample of dried lambda-manganese dioxide powder prepared in the manner described in Example 1 was blended with natural graphite (Nacionale de Grafite, MP-0702X) and electrolyte solution in a weight ratio of 87:8:5. Button cells were prepared from this wet mixture as described in Example 1.

OCV values measured for fresh cells are given in Table 2. Cells were discharged at 3 mA and 30 mA, nominally corresponding to C/40 and C/4 rates for Comparative Examples 5a and 5b, respectively. Average specific capacities for fresh cells discharged continuously at C/40 and C/4 rates to 1V and 0.8V cutoffs are given in Table 2.

A number of embodiments of the invention have been described. Nevertheless, it will be understood that various modifications may be made without departing from the spirit and scope of the invention. For example, oxidative delithiation of the precursor spinel can be performed using a variety of aqueous oxidizing agents including, for example, an aqueous solution of ammonium, sodium or potassium peroxydisulfate, sodium or potassium peroxydiphosphate, sodium perborate, sodium or potassium hypochlorite, sodium or potassium chlorate, sodium bromate, sodium or potassium permanganate or cerium (+4) ammonium sulfate or nitrate. Non-aqueous oxidizing agents can include, for example, an acetonitrile solution of nitrosonium or nitronium tetrafluoroborate, an acetonitrile solution of nitrosonium or nitronium hexafluorophosphate or a solution of oleum (i.e., $SO_3/H_2SO_4$) in sulfolane. The use of an aqueous oxidizing agent under basic conditions or a non-aqueous oxidizing agent to oxidize the $Mn^{+3}$ ions in the $LiMn_2O_4$ spinel to $Mn^{+4}$ ions can result in substantially less manganese being lost by dissolution than is typical for treatment with strong acids. The use of an aqueous oxidizing agent at high pH values, is preferred since ion-exchange of lithium ions in the lambda-manganese dioxide lattice by protons is less likely to occur under basic conditions.

Alternatively, a cathode containing an admixture of lambda-manganese dioxide and γ-$MnO_2$ can be included in a prismatic air-recovery battery, such as an air-assisted or air-restored battery as described in U.S. Pat. No. 6,270,921, which is incorporated by reference in its entirety. Such a cathode also can be included in a rechargeable alkaline $MnO_2$/Zn cell, such as described, for example, in U.S. Pat. No. 4,384,029, which is incorporated by reference in its entirety. Further, cathodes containing admixtures of lambda-manganese dioxide and gamma-manganese dioxide can be modified by introducing bismuth ions into the gamma-manganese dioxide structure to improve the reversibility of the cathode, thereby increasing cycle life of a rechargeable alkaline cell as described in U.S. Pat. No. 4,451,543.

Other embodiments are within the claims.

What is claimed is:

1. An alkaline battery comprising:
   a cathode comprising a binder, carbon particles that are different from the binder, and an active cathode material including a lambda-manganese dioxide and a gamma-manganese dioxide;
   an anode comprising zinc;
   a separator between the anode and the cathode; and
   an alkaline electrolyte contacting the anode and the cathode,
   wherein the weight ratio of lambda-manganese dioxide to gamma-manganese dioxide ranges from 1:19 to 3:1.

2. The battery of claim 1, wherein the fraction of lambda-manganese dioxide is substantially less than the fraction of gamma-manganese dioxide.

3. The battery of claim 1, wherein the weight ratio of lambda-manganese dioxide to gamma-manganese dioxide ranges from 1:9 to 1:1.

4. The battery of claim 1, wherein the weight ratio of lambda-manganese dioxide to gamma-manganese dioxide ranges from 1:3 to 1:1.

5. The battery of claim 1, wherein the cathode includes between 2 wt % and 10 wt % of carbon particles.

6. The battery of claim 1, wherein the carbon particles include expanded graphite, natural graphite, or a blend thereof.

7. The battery of claim 1, wherein the carbon particles include from 10 to 90% by weight natural graphite.

8. The battery of claim 1, wherein the gamma-manganese dioxide is an electrochemically-produced manganese dioxide.

9. The battery of claim 1, wherein the binder comprises a polymer selected from the group consisting of polyethylene, polyacrylamide, polyvinylidenefluoride, and polytetrafluoroethylene.

10. The battery of claim 1, wherein the binder comprises polyethylene.

11. The battery of claim 1, wherein the cathode includes between 0.05 wt % and 5 wt % of the binder.

12. An alkaline battery comprising:
   a cathode comprising a binder, carbon particles that are different from the binder, and an active cathode material including a lambda-manganese dioxide and a gamma-manganese dioxide in a weight ratio of at least 1:9, a natural graphite and an expanded graphite;
   an anode including zinc;
   a separator between the anode and the cathode; and
   an electrolyte contacting the cathode, the anode and the separator.

13. The battery of claim 12, wherein the weight ratio of lambda-manganese dioxide to gamma-manganese dioxide ranges from 1:3 to 1:1.

14. The battery of claim 12, wherein the cathode includes between 2 wt % and 10 wt % of carbon particles.

15. The battery of claim 12, wherein the carbon particles include from 10 to 90% by weight natural graphite.

16. The battery of claim 12, wherein the binder comprises a polymer selected from the group consisting of polyethylene, polyacrylamide, polyvinylidenefluoride, and polytetrafluoroethylene.

17. The battery of claim 12, wherein the binder comprises polyethylene.

18. The battery of claim 12, wherein the cathode includes between 0.05 wt % and 5 wt % of the binder.

19. A method of manufacturing an alkaline battery, the method comprising:
   providing a positive electrode including a binder, carbon particles that are different from the binder, and an active cathode material including a lambda-manganese dioxide and a gamma-manganese dioxide; and
   forming a battery including the positive electrode and a zinc electrode,
   wherein the weight ratio of lambda-manganese dioxide to gamma-manganese dioxide ranges from 1:19 to 3:1.

20. The method of claim 19, wherein providing the electrode includes preparing lambda-manganese dioxide by a method comprising:
   contacting water with a lithium manganese oxide;
   adding an acid to the water and compound until the water has a pH of 1 or less;
   separating a solid from the water and acid; and
   drying the solid at a temperature of 150° C. or below to obtain the lambda-manganese dioxide.

21. The method of claim 20, wherein the lithium manganese oxide is a compound of the formula $Li_{1+x}Mn_{2-x}O_4$, wherein x is from −0.02 to +0.02 and the compound has a B.E.T. specific surface area of between 1 and 10 $m^2/g$.

22. The method of claim 20, wherein the solid is dried at a temperature of less than about 120° C.

23. The method of claim 19, wherein providing a positive electrode includes combining between 2 wt % and 10 wt % carbon particles with the active cathode material.

24. The method of claim 23, wherein the carbon particles include expanded graphite, natural graphite, or a blend thereof.

25. The method of claim 19, wherein the gamma-manganese dioxide is an electrochemically-produced manganese dioxide.

26. The method of claim 19, wherein the binder comprises a polymer selected from the group consisting of polyethylene, polyacrylamide, polyvinylidenefluoride, and polytetrafluoroethylene.

27. The method of claim 19, wherein the binder comprises polyethylene.

28. The method of claim 19, wherein the positive electrode includes between 0.05 wt % and 5 wt % of the binder.

29. A method of manufacturing an alkaline battery, the method comprising:

providing a positive electrode including a binder, carbon particles that are different from the binder, and an active cathode material including a lambda-manganese dioxide and a gamma-manganese dioxide in a weight ratio of at least 1:9, a natural graphite and an expanded graphite; and forming a battery including the positive electrode and a zinc electrode.

30. The method of claim 29, wherein the binder comprises a polymer selected from the group consisting of polyethylene, polyacrylamide, polyvinylidenefluoride, and polytetrafluoroethylene.

31. The method of claim 29, wherein the binder comprises polyethylene.

32. The method of claim 29, wherein the positive electrode includes between 0.05 wt % and 5 wt % of the binder.

* * * * *